(12) United States Patent
Peng et al.

(10) Patent No.: US 9,651,837 B2
(45) Date of Patent: May 16, 2017

(54) LIQUID CRYSTAL DISPLAY PANEL STRUCTURE

(71) Applicant: Century Technology (Shenzhen) Corporation Limited, Shenzhen (CN)

(72) Inventors: Hai-Bo Peng, Shenzhen (CN); Chen-Fu Mai, New Taipei (TW)

(73) Assignee: Century Technology (Shenzhen) Corporation Limited, Shenzhen (CN)

( * ) Notice: Subject to any disclaimer, the term of this patent is extended or adjusted under 35 U.S.C. 154(b) by 49 days.

(21) Appl. No.: 14/735,744

(22) Filed: Jun. 10, 2015

(65) Prior Publication Data

US 2016/0291429 A1 Oct. 6, 2016

(30) Foreign Application Priority Data

Mar. 30, 2015 (CN) .......................... 2015 1 0143195

(51) Int. Cl.
  *G02F 1/1362* (2006.01)
  *G02F 1/1339* (2006.01)
  *G02F 1/1343* (2006.01)

(52) U.S. Cl.
  CPC ...... *G02F 1/136204* (2013.01); *G02F 1/1339* (2013.01); *G02F 1/134363* (2013.01); *G02F 2001/134381* (2013.01); *G02F 2202/16* (2013.01)

(58) Field of Classification Search
  CPC .................. G02F 1/136204; G02F 1/13439
  See application file for complete search history.

(56) References Cited

U.S. PATENT DOCUMENTS

| 5,760,855 A * | 6/1998 | Nakase | G02F 1/136204 349/149 |
| 2010/0079694 A1* | 4/2010 | Yoshida | G02F 1/134363 349/40 |
| 2010/0171896 A1* | 7/2010 | Yoshida | G02F 1/1345 349/48 |
| 2011/0170043 A1* | 7/2011 | Lim | G02F 1/13452 349/116 |
| 2011/0181550 A1* | 7/2011 | Hotelling | G06F 3/0416 345/174 |
| 2012/0194772 A1* | 8/2012 | Moriwaki | G02F 1/1339 349/138 |
| 2013/0038830 A1* | 2/2013 | Sato | G02F 1/134363 349/149 |
| 2013/0093706 A1* | 4/2013 | Kurasawa | G06F 3/0412 345/173 |

(Continued)

*Primary Examiner* — Sang V Nguyen
(74) *Attorney, Agent, or Firm* — Steven Reiss

(57) ABSTRACT

A liquid crystal display panel includes a first substrate, a second substrate parallel to the first substrate, a liquid crystal layer located between the first substrate and the second substrate and parallel to the first substrate and the second substrate, a common electrode layer and a pixel electrode located between the first substrate and the second substrate, and an electrical conducting layer located on a side of the second substrate opposite from the first substrate. The electrical conducting layer is electrically coupled to a common electrode wiring located on an outer peripheral portion of the first substrate. The pixel electrode and the common electrode layer are configured to cooperatively induce an electric field to drive liquid crystals of the liquid crystal layer to rotate.

17 Claims, 7 Drawing Sheets

(56) References Cited

U.S. PATENT DOCUMENTS

| | | | | |
|---|---|---|---|---|
| 2014/0132859 A1* | 5/2014 | Yanase | G06F 3/0412 | 349/12 |
| 2014/0232953 A1* | 8/2014 | Tago | G02F 1/133555 | 349/12 |
| 2014/0285478 A1* | 9/2014 | Ono | G09G 3/3614 | 345/209 |
| 2015/0338692 A1* | 11/2015 | Yu-Jin | G02F 1/1368 | 349/33 |
| 2016/0026846 A1* | 1/2016 | Lin | G06K 9/0002 | 382/124 |
| 2016/0085129 A1* | 3/2016 | Cammenga | G02F 1/161 | 359/275 |
| 2016/0098143 A1* | 4/2016 | Kida | G06F 3/041 | 345/174 |

* cited by examiner

LIQUID CRYSTAL DISPLAY PANEL STRUCTURE

FIELD

The subject matter herein generally relates to liquid crystal display panels, and more particularly to a liquid crystal display panel capable of providing an electrostatic shielding effect for a liquid crystal layer of the liquid crystal display panel.

BACKGROUND

A liquid crystal display panel generally includes an array substrate, a color filter substrate, and a liquid crystal layer. The liquid crystal layer is located between the array substrate and the color filter substrate. The liquid crystal layer comprises a plurality of liquid crystals that are controlled to rotate to create a display. When electrostatic interference is created on the liquid crystal display panel, rotation of the liquid crystals can be interrupted.

BRIEF DESCRIPTION OF THE DRAWINGS

Implementations of the present technology will now be described, by way of example only, with reference to the attached figures.

DETAILED DESCRIPTION

Figure 1:
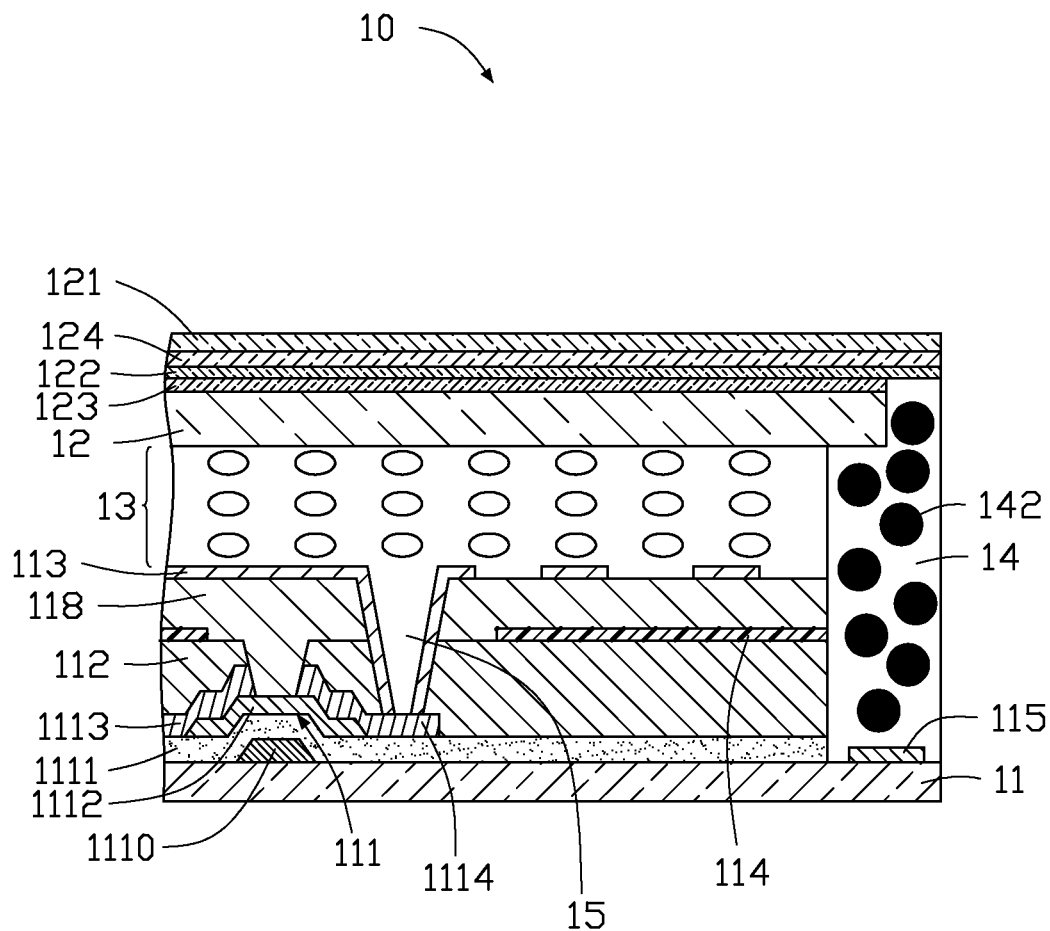
FIG. 1 is a cross-sectional view of a first embodiment of a liquid crystal display panel.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts can be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

FIG. 1 illustrates a first embodiment of a liquid crystal display panel 10 for providing an electrostatic shielding effect. In at least one embodiment, the liquid crystal display panel 10 can be an in-plane switching or a fringe field switching liquid crystal display. The liquid crystal display 10 can include a first substrate 11, a second substrate 12, and a liquid crystal layer 13. The liquid crystal layer 13 can be located between and substantially parallel to the first substrate 11 and the second substrate 12. Sealing material 14 can be formed around a peripheral edge of the liquid crystal layer 13. In at least one embodiment, the first substrate 11 can be an array substrate, and the second substrate 12 can be a color filter substrate. A thin film transistor 111 can be located on the first substrate 11. The thin film transistor 111 can be electrically coupled to a pixel electrode 113. A common electrode layer 114 can be located between the first substrate 11 and the second substrate 12 and be electrically isolated from the pixel electrode 113. A first passivation layer 112 can be layered on the thin film transistor 111. The pixel electrode 113 and the common electrode layer 114 can cooperatively induce a planar electric field for controlling liquid crystals in the liquid crystal layer 13 to rotate within a plane of the planar electric field.

A polarizer 121 can be located on a side of the second substrate 12 opposite from the liquid crystal layer 13. A thin film 124 can be located on a side of the polarizer 121 facing the second substrate 12. An electrical conducting layer 122 can be located on a side of the thin film 124 facing the second substrate 12. The sealing material 14 can electrically couple the electrical conducting layer 122 to a common electrode wiring 115 located on an outer peripheral portion of the first substrate 11. The sealing material 14 can electrically couple a plurality of common electrode wirings 115 to the electrical conducting layer 122. The sealing material 14 can include a plurality of electrical conducting particles 142 to electrically couple the electrical conducting layer 122 to the common electrode wiring 115. In at least one embodiment, the plurality of electrical conducting particles 142 is a plurality of gold particles. The electrical conducting layer 122 electrically coupled to the common electrode wiring 115 can provide an electrostatic shielding effect for the liquid crystal layer 13.

In at least one embodiment, the common electrode layer 114 and the pixel electrode 113 can be made of transparent electrically conductive materials, and the common electrode wiring 115 can be made of non-transparent metal. In at least one embodiment, the thin film 124 can be a polyethylene terephthalate (PET) film, and the electrical conducting layer 122 can be an indium tin oxide (ITO) film. The ITO film can be first formed on the PET film to create a PET-ITO film, and then the PET-ITO film can be applied onto the second substrate 12 by a pressure sensitive adhesive 123.

The thin film transistor 111 can include a gate electrode 1110 located on the first substrate 11, a gate insulating later 1111 covered over the gate electrode 1110, a channel layer 1112 corresponding to the gate electrode 1110 and located on the gate insulating layer 1111, and a source electrode 1113 and a drain electrode 1114 both located on the channel layer 1112. The first passivation layer 112 can be covered over the source electrode 1113, the drain electrode 1114, and the gate electrode 1110. A second passivation layer 118 can be covered over the first passivation layer 112. The pixel electrode 113 can be located on a surface of the second passivation layer 118. The first passivation layer 112 and the second passivation layer 118 can both be made of insulating materials. A connecting hole 15 can be defined through the first passivation layer 112 and the second passivation layer 118 to electrically couple the pixel electrode 113 to the drain electrode 1114. One end of the connecting hole 15 can open to the liquid crystal layer 13, and an opposite end of the connecting hole 15 can open to the drain electrode 1114.

In at least one embodiment, a length of the electrical conducting layer 122 can be about 5 to about 10 millimeters longer than the second substrate 12. A sheet resistance of the electrical conducting layer 122 can be less than 1000 ohms per square centimeter ($\Omega/cm^2$).

Figure 2:
FIG. 2 is a top plan view of an embodiment of an electric conducting layer of FIG. 1.

FIG. 2 illustrates one embodiment of the electrical conducting layer 122. The electrical conducting layer 122 can be a transparent electrode.

Figure 3:
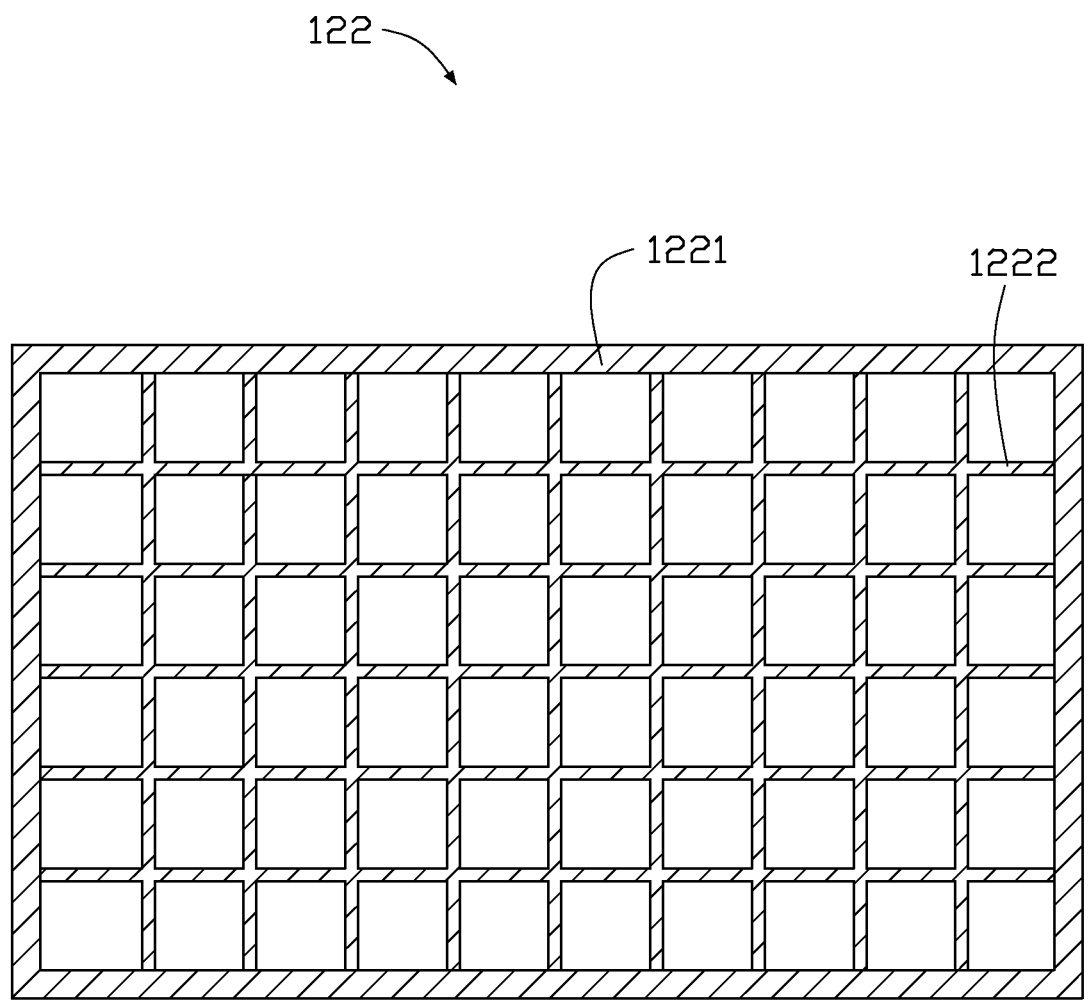
FIG. 3 is a top plan view of another embodiment of an electric conducting layer of FIG. 1.

FIG. 3 illustrates another embodiment of the electrical conducting layer 122. The electrical conducting layer 122 can be non-transparent and include a peripheral electrode 1221 and a plurality of crisscrossing electrodes 1222. The peripheral electrode 1221 can be formed entirely around a peripheral edge of the electrical conducting layer 122, and the plurality of crisscrossing electrodes 1222 can form a grid pattern on the electrical conducting layer 122 and cross with the peripheral electrode 1221.

Figure 4:
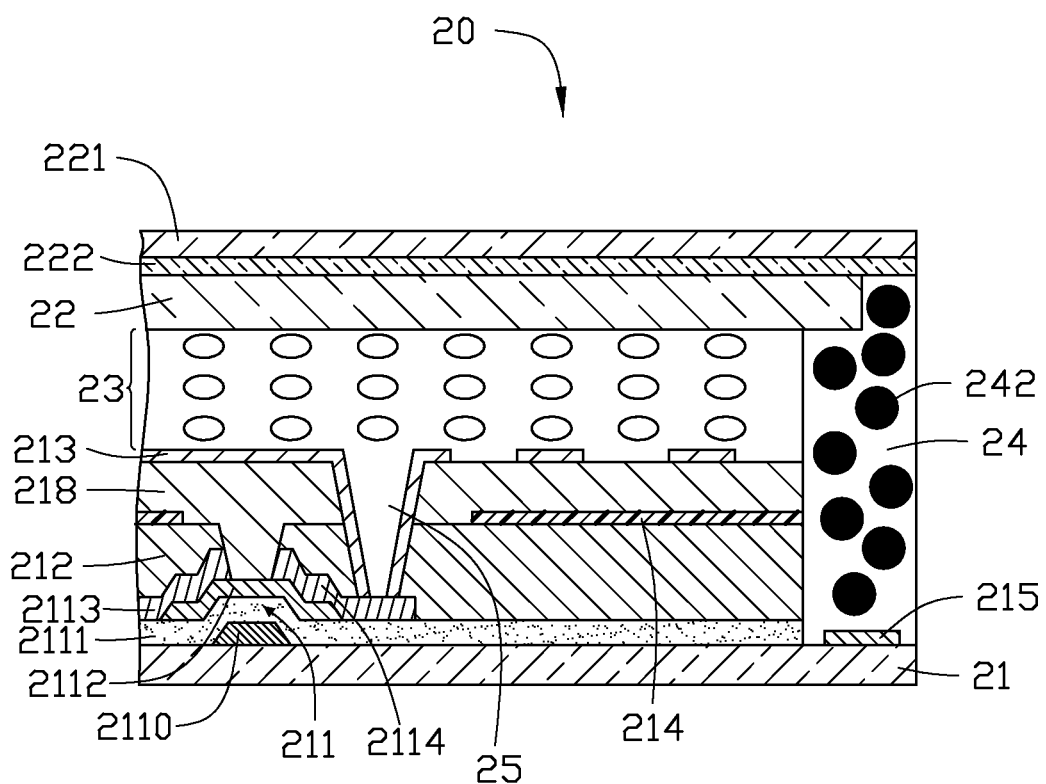
FIG. 4 is a cross-sectional view of a second embodiment of a liquid crystal display panel.

FIG. 4 illustrates a second embodiment of a liquid crystal display panel 20 for providing an electrostatic shielding effect. In at least one embodiment, the liquid crystal display panel 20 can be an in-plane switching or a fringe field switching liquid crystal display. The liquid crystal display 20 can include a first substrate 21, a second substrate 22, and a liquid crystal layer 23. The liquid crystal layer 23 can be located between and substantially parallel to the first substrate 21 and the second substrate 22. Sealing material 24 can be formed around a peripheral edge of the liquid crystal layer 23. In at least one embodiment, the first substrate 21 can be an array substrate, and the second substrate 22 can be a color filter substrate. A thin film transistor 211 can be located on the first substrate 21. The thin film transistor 211 can be electrically coupled to a pixel electrode 213. A common electrode layer 214 can be located between the first substrate 21 and the second substrate 22 and be electrically isolated from the pixel electrode 213. A first passivation layer 212 can be layered on the thin film transistor 211. The pixel electrode 213 and the common electrode layer 214 can cooperatively induce a planar electric field for controlling liquid crystals in the liquid crystal layer 23 to rotate within a plane of the planar electric field.

A polarizer 221 can be located on a side of the second substrate 22 opposite from the liquid crystal layer 23. An electrical conducting layer 122 can be located between the polarizer 221 and the second substrate 22. The sealing material 24 can electrically couple the electrical conducting layer 222 to a common electrode wiring 215 located on an outer peripheral portion of the first substrate 21. The sealing material 24 can electrically couple a plurality of common electrode wirings 215 to the electrical conducting layer 222. The sealing material 24 can include a plurality of electrical conducting particles 242 to electrically couple the electrical conducting layer 222 to the common electrode wiring 215. In at least one embodiment, the plurality of electrical conducting particles 242 is a plurality of gold particles. The electrical conducting layer 222 electrically coupled to the common electrode wiring 215 can provide an electrostatic shielding effect for the liquid crystal layer 23.

In at least one embodiment, the common electrode layer 214 and the pixel electrode 213 can be made of transparent electrically conductive materials, and the common electrode wiring 215 can be made of non-transparent metal. In at least one embodiment, the electrical conducting layer 222 can be an ITO film. The ITO film can be directly deposited onto the second substrate 22 by a low-temperature magnetron sputtering method.

The thin film transistor 211 can include a gate electrode 2110 located on the first substrate 21, a gate insulating later 2111 covered over the gate electrode 2110, a channel layer 2112 corresponding to the gate electrode 2110 and located on the gate insulating layer 2111, and a source electrode 2113 and a drain electrode 2114 both located on the channel layer 2112. The first passivation layer 212 can be covered over the source electrode 2113, the drain electrode 2114, and the gate electrode 2110. A second passivation layer 218 can be covered over the first passivation layer 212. The pixel electrode 213 can be located on a surface of the second passivation layer 218. The first passivation layer 212 and the second passivation layer 218 can both be made of insulating materials. A connecting hole 25 can be defined through the first passivation layer 212 and the second passivation layer 218 to electrically couple the pixel electrode 213 to the drain electrode 2114. One end of the connecting hole 25 can open to the liquid crystal layer 23, and an opposite end of the connecting hole 25 can open to the drain electrode 2114.

In at least one embodiment, a length of the electrical conducting layer 222 can be about 5 to about 10 millimeters longer than the second substrate 22. A sheet resistance of the electrical conducting layer 222 can be less than 1000 $\Omega/cm^2$.

Figure 5:
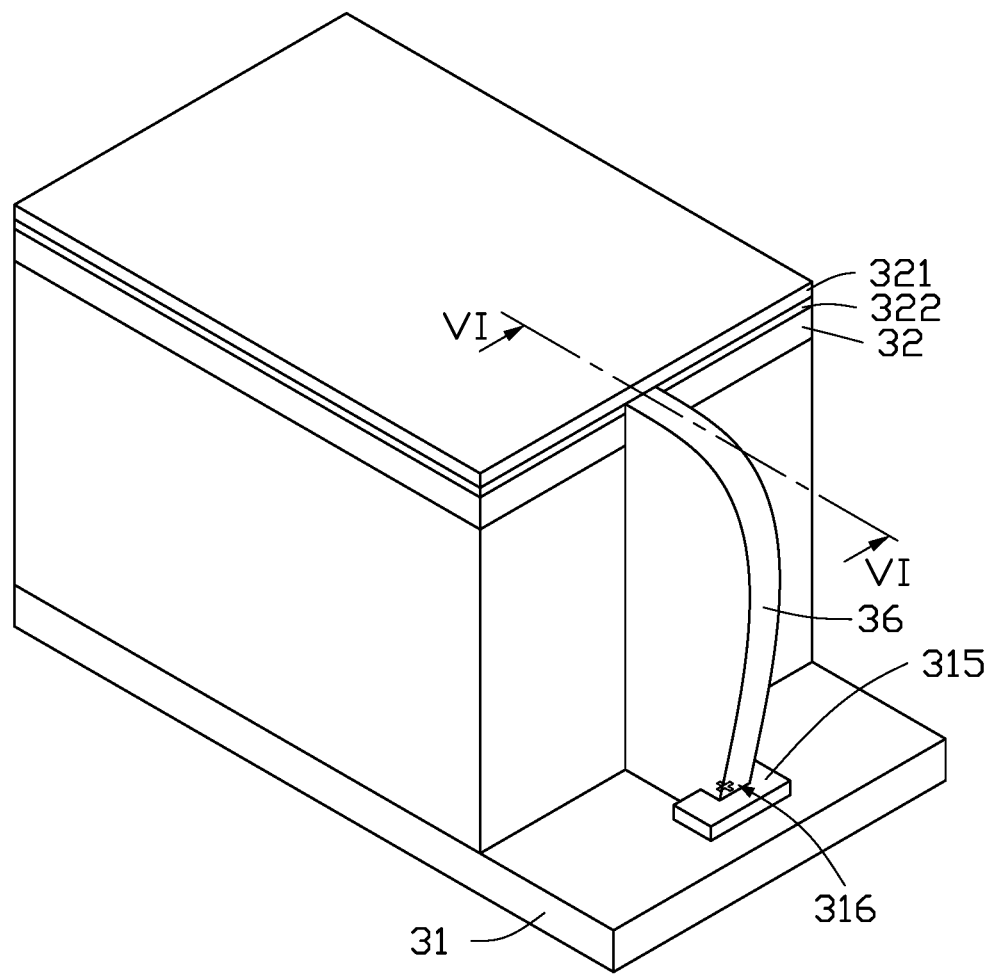
FIG. 5 is an isometric view of a third embodiment of a liquid crystal display panel.
Figure 6:
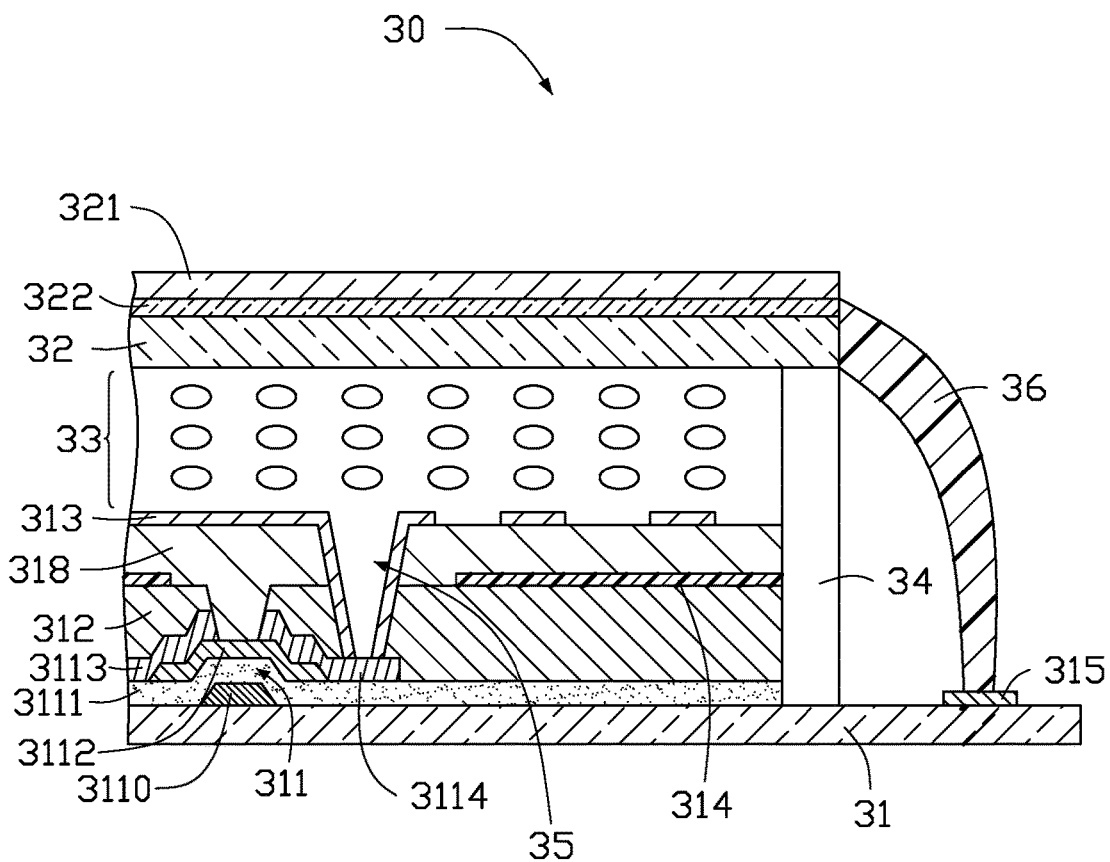
FIG. 6 is a cross-sectional view of the liquid crystal display panel of FIG. 5 taken along line VI-VI.

FIGS. 5 and 6 illustrate a third embodiment of a liquid crystal display panel 30 for providing an electrostatic shielding effect. In at least one embodiment, the liquid crystal display panel 30 can be an in-plane switching or a fringe field switching liquid crystal display. The liquid crystal display 30 can include a first substrate 31, a second substrate 32, and a liquid crystal layer 33. The liquid crystal layer 33 can be located between and substantially parallel to the first substrate 31 and the second substrate 32. Sealing material 34 can be formed around a peripheral edge of the liquid crystal layer 33. In at least one embodiment, the first substrate 31 can be an array substrate, and the second substrate 32 can be a color filter substrate. A thin film transistor 111 can be located on the first substrate 31. The thin film transistor 311 can be electrically coupled to a pixel electrode 313. A common electrode layer 314 can be located between the first substrate 31 and the second substrate 32 and be electrically isolated from the pixel electrode 313. A first passivation layer 312 can be layered on the thin film transistor 311. The pixel electrode 313 and the common electrode layer 314 can cooperatively induce a planar electric field for controlling liquid crystals in the liquid crystal layer 33 to rotate within a plane of the planar electric field.

A polarizer 321 can be located on a side of the second substrate 32 opposite from the liquid crystal layer 33. An electrical conducting layer 122 can be located between the polarizer 321 and the second substrate 32. The electrical conducting layer 122 electrically coupled to the common electrode wiring 115 can provide an electrostatic shielding effect for the liquid crystal layer 13.

In at least one embodiment, the common electrode layer 314 and the pixel electrode 313 can be made of transparent electrically conductive materials, and the common electrode wiring 315 can be made of non-transparent metal.

The thin film transistor 311 can include a gate electrode 3110 located on the first substrate 31, a gate insulating later 3111 covered over the gate electrode 3110, a channel layer 3112 corresponding to the gate electrode 3110 and located on the gate insulating layer 3111, and a source electrode 3113 and a drain electrode 3114 both located on the channel layer 3112. The first passivation layer 312 can be covered over the source electrode 3113, the drain electrode 3114, and the gate electrode 3110. A second passivation layer 318 can be covered over the first passivation layer 312. The pixel electrode 313 can be located on a surface of the second passivation layer 318. The first passivation layer 312 and the second passivation layer 318 can both be made of insulating materials. A connecting hole 35 can be defined through the first passivation layer 312 and the second passivation layer 318 to electrically couple the pixel electrode 313 to the drain electrode 3114. One end of the connecting hole 35 can open to the liquid crystal layer 33, and an opposite end of the connecting hole 35 can open to the drain electrode 3114.

In at least one embodiment, a sheet resistance of the electrical conducting layer 322 can be less than 1000 $\Omega/cm^2$.

In at least one embodiment, the electrical conducting layer 322 can be an ITO film. In the third embodiment, the electrical conducting layer 322 can be directly deposited on the polarizer 321 by a low-temperature magnetron sputtering method. In another embodiment (not shown in figures), the electrical conducting layer 322 can be first formed on a PET film to form a PET-ITO film, and then the PET-ITO film can be applied onto the second substrate 32 by a pressure sensitive adhesive as described in the first embodiment.

A length of the electrical conducting layer 322 is not longer than the second substrate 32. The common electrode wiring 315 can be located on a peripheral portion of the first substrate 31 outside of an active area of the liquid crystal display 30. In the third embodiment, the electrical conducting layer 322 can be electrically coupled to the common electrode wiring 315 by electrical conducting material 36 applied between the common electrode wiring 315 and an outer edge portion of the electrical conducting layer 322. A plurality of electrical conducting materials 36 can electrically couple a plurality of common electrode wirings 315 to a plurality of outer edge portions of the electrical conducting layer 322. In at least one embodiment, the electrical conducting material 35 is silver epoxy resin.

Figure 7:
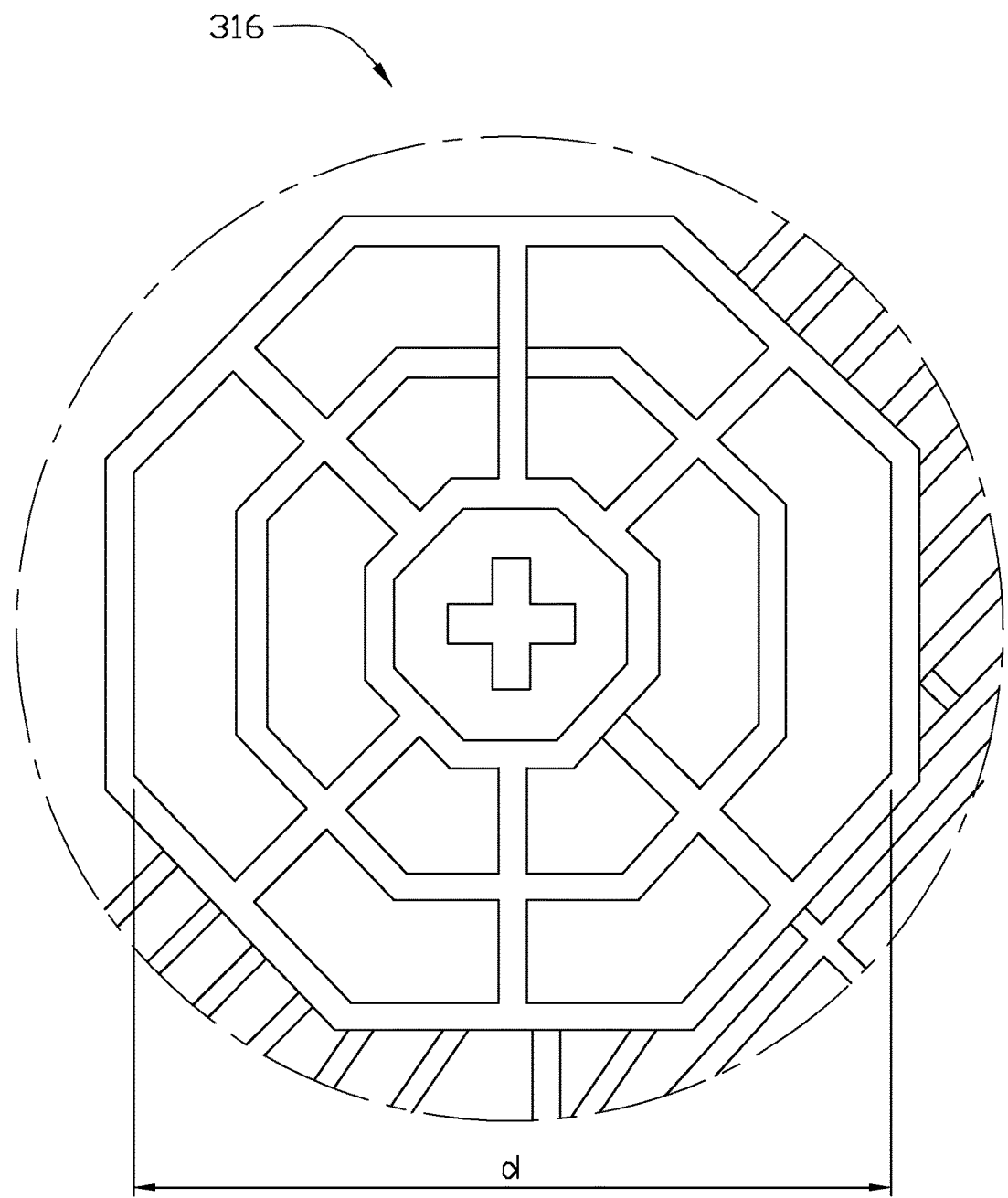
FIG. 7 is a diagrammatic view of a pattern of a common electrode wiring of FIG. 6.

Referring to FIG. 7, in the third embodiment, the common electrode wiring 315 can form a pattern 316 on the first substrate 31 to facilitate accurate deposition of the electrical conducting material 36. In at least one embodiment, the pattern 316 is an eight trigrams pattern having a predefined width "d".

By using the liquid crystal displays 10, 20, and 30, the electrical conductive layers 122, 222, and 322 electrically coupled to the common electrode wirings 115, 215, and 315, respectively, provide an electrostatic shielding effect for the liquid crystal layers 13, 23, and 33, respectively. Thus, an orientation of the liquid crystals in the liquid crystal layers 13, 23, and 33 is maintained, and a quality of display is improved.

The embodiments shown and described above are only examples. Even though numerous characteristics and advantages of the present technology have been set forth in the foregoing description, together with details of the structure and function of the present disclosure, the disclosure is illustrative only, and changes can be made in the detail, including in matters of shape, size and arrangement of the parts within the principles of the present disclosure up to, and including, the full extent established by the broad general meaning of the terms used in the claims.

What is claimed is:

1. A liquid crystal display panel comprising:
   a first substrate;
   a second substrate parallel to the first substrate;
   a liquid crystal layer between the first substrate and the second substrate and parallel to the first substrate and the second substrate;
   a common electrode layer between the first substrate and the second substrate;
   a pixel electrode between the first substrate and the second substrate, the common electrode layer and the pixel electrode being configured to cooperatively induce an electric field to rotate liquid crystals of the liquid crystal layer;
   a common electrode wiring on a peripheral of the first substrate; and
   an electrical conducting layer located at a side of the second substrate away from the first substrate and electrically coupled to the common electrode wiring;
   wherein a length of the electrical conducting layer is longer than a length of the second substrate.

2. The liquid crystal display panel as in claim 1, wherein the electrical conducting layer is made of indium tin oxide.

3. The liquid crystal display panel as in claim 1, wherein a sheet resistance of the electrical conducting layer is less than 1000 $\Omega/cm^2$.

4. The liquid crystal display panel as in claim 1, wherein the first substrate is an array substrate, and the second substrate is a color filter substrate.

5. The liquid crystal display panel as in claim 1, wherein the liquid crystal display panel is an in-plane switching liquid crystal display panel or a fringe field switching liquid crystal display panel.

6. The liquid crystal display panel as in claim 1, wherein the electrical conducting layer is transparent.

7. The liquid crystal display as in claim 1, wherein the electrical conducting layer comprises a peripheral electrode formed entirely around a peripheral edge thereof, and further comprises a plurality of crisscrossing electrodes forming a grid pattern on the electrical conducting layer and crossing with the peripheral electrode; the electrical conducting layer is not transparent; and the plurality of crisscrossing electrodes align with a black matrix of the liquid crystal display panel.

8. The liquid crystal display panel as in claim 1, wherein a connecting hole is defined through a first passivation layer and a second passivation layer to electrically couple the pixel electrode to a drain electrode of a thin film transistor; one end of the connecting hole opens to the liquid crystal layer, and an opposite end of the connecting hole opens to the drain electrode.

9. The liquid crystal display panel as in claim 8, wherein a sealing material is formed around the liquid crystal layer the sealing material is electrically coupled between the electrical conducting layer and the first substrate; the sealing material is electrically conductive.

10. The liquid crystal display panel as in claim 9, wherein the sealing material comprises a plurality of electrical conducting particles to electrically couple the electrical conducting layer to the common electrode wiring.

11. The liquid crystal display panel as in claim 10, wherein the plurality of electrical conducting particles is a plurality of gold particles dispersed throughout the sealing material.

12. The liquid crystal display panel as in claim 9, wherein the electrical conducting layer is formed on a thin film; the thin film with the electrical conducting layer is applied onto the second substrate by a pressure sensitive adhesive; the electrical conducting layer faces toward the second substrate; and the thin film faces toward a polarizer.

13. The liquid crystal display as in claim 12, wherein the thin film is made of polyethylene terepthalate.

14. The liquid crystal display panel as in claim 9, wherein the electrical conducting layer is directly deposited onto the polarizer by a low-temperature magnetron sputtering method.

15. The liquid crystal display panel as in claim 9, wherein the common electrode wiring is electrically coupled to an outer edge portion of the electrical conducting layer.

16. A liquid crystal display panel comprising:
a first substrate;
a second substrate facing the first substrate;
a liquid crystal layer between the first substrate and the second substrate;
a common electrode layer on the first substrate;
a sealing material around the liquid crystal layer, the sealing material located between the first substrate and the second substrate;
an electrical conducting layer on a side of the second substrate away from the first substrate; and
a common electrode wiring located on an outer peripheral portion of the first substrate;
wherein an electrical conducting material is located at a side of the sealing material away from the liquid crystal layer, the electrical conducting material is electrically coupled between the electrical conducting layer and the common electrode wiring.

17. A liquid crystal display panel comprising:
a first substrate;
a second substrate facing the first substrate;
a liquid crystal layer between the first substrate and the second substrate;
a common electrode layer on the first substrate;
an electrical conducting layer on a side of the second substrate away from the first substrate;
a common electrode wiring on a peripheral portion of the first substrate; and
a sealing material around the liquid crystal layer, the sealing material located between the first substrate and the second substrate, the sealing material being electrically conductive and electrically coupled between the electrical conducting layer and the common electrode wiring;
wherein a length of the electrical conducting layer is longer than a length of the second substrate.

* * * * *